United States Patent [19]
Uebbing et al.

[11] 4,143,809
[45] Mar. 13, 1979

[54] OPTICAL BAR CODE READER

[75] Inventors: John J. Uebbing, Palo Alto; Perry Jeung, Sunnyvale, both of Calif.

[73] Assignee: Hewlett-Packard Company, Palo Alto, Calif.

[21] Appl. No.: 840,874

[22] Filed: Oct. 11, 1977

[51] Int. Cl.$^2$ .................... G06K 7/10; G06K 7/14; G08C 9/06
[52] U.S. Cl. .................... 235/462; 235/472; 250/566
[58] Field of Search .............. 235/454, 462, 470, 472; 250/555, 566, 568, 569

[56] References Cited

U.S. PATENT DOCUMENTS

| | | | |
|---|---|---|---|
| 2,039,406 | 5/1936 | Greensfelder | 235/470 |
| 2,325,941 | 8/1943 | Dickinson | 235/454 |
| 2,983,446 | 5/1961 | Zogg | 235/470 |
| 3,784,832 | 1/1974 | Sewell | 235/470 |
| 3,809,863 | 5/1974 | Oberg | 235/472 |

Primary Examiner—Daryl W. Cook
Attorney, Agent, or Firm—Ronald E. Grubman

[57] ABSTRACT

An optical bar code reader is provided employing a dual focusing system in which a source of light is focused by a first lens to a small area of the bar code, which reflects the light back through a second lens to a detector. In preferred embodiments of the invention the source and detector are solid state semiconductors mounted on the same substrate, while the focusing lenses are integrally molded as part of a single lens support. Spherical aberration is minimized by utilizing aspheric lenses.

3 Claims, 2 Drawing Figures

OPTICAL BAR CODE READER

BACKGROUND OF THE INVENTION

It is now a wide-spread practice to encode data such as product identification on the labels of commericial items using a set of parallel lines ("bars") of varying thickness. This scheme, commonly called a bar code, exploits the relative bar width and/or the spacing between bars to code the data.

In the prior art it is known to optically read bar codes with a hand-held scanner known as a bar code reader. Different types of bar code readers are known in the art, usually including a light source to illuminate the bar code pattern, and a detector to receive light reflected from the bar code. One approach used in the prior art is the "flood light" system, in which one or more light sources illluminates a large area (generally wider than several bars) causing light to be reflected back onto a detector. By employing lenses and/or aperatures, it is provided that only light reflected from a desired point on the bar code will be received by the detector. U.S. Pat. No. 3,784,794 shows a bar code reader of the flood light type. This type of system tends to be inefficient since much of the emitted light is not transmitted to the detector and is therefore wasted.

Another type of optical bar code reader known in the prior art uses fiber optic bundles to transfer light from a source to the bar code and to transfer reflected light back to a detector. These devices use costly fiber optics and also tend to be difficult to assemble and align.

SUMMARY OF THE INVENTION

In accordance with the illustrated preferred embodiments, the present invention provides an optical bar code reader employing a dual focussing system in which a source of light is focused by a first lens to a small area of the bar code, while light reflected from the bar code is focused by a second lens to a detector. In preferred embodiments of the invention the source and detector are solid state semiconductors mounted on the same substrate while the focussing lenses are integrally molded as part of a single lens support. Spherical aberration is minimized by utilizing aspheric lenses.

DETAILED DESCRIPTION OF THE INVENTION

Figure 1:
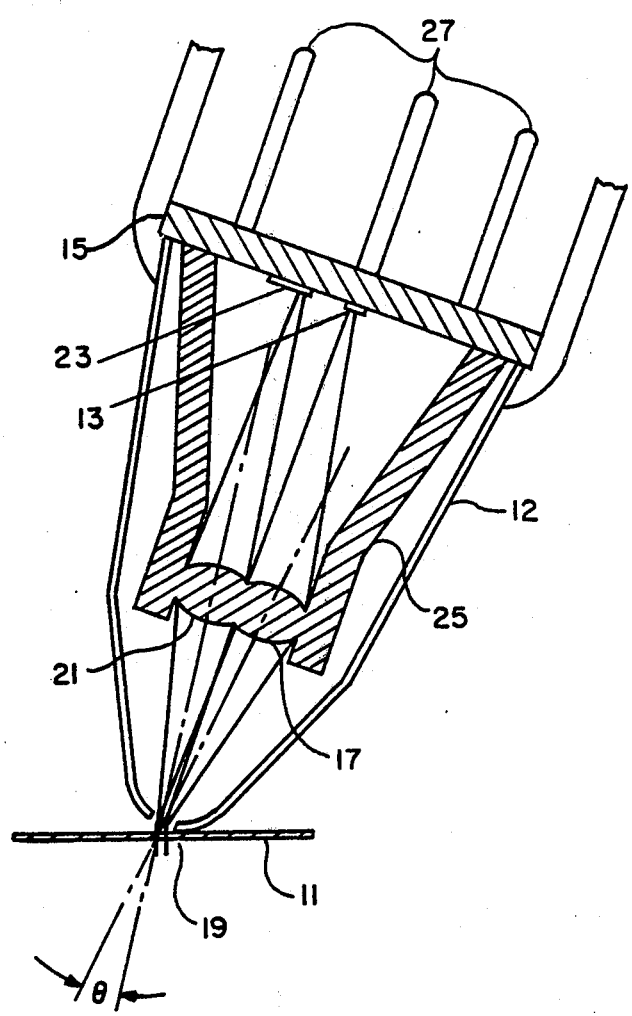
FIG. 1 illustrates a preferred embodiment of an optical bar code reader.

In FIG. 1 there is shown in cross-section a surface 11 having printed or otherwise encoded thereon a bar code consisting of a number of bars of different widths, as is now well known in the art. The code is optically sensed by a bar code reader including a housing 12 enclosing a source of light 13 which is preferably a solid-state light emitting diode (LED) mounted on a substrate 15, which may be e.g. of ceramic, plastic or metal. Light emitted from source 13 is directed to a lens 17 which focuses the light onto a small region 19 on surface 11, about 0.007" in diameter. Since the typical bar width is about 0.008" the light is essentially directed to an area encompassing only a single bar. It is also permissable to illuminate more than one bar, but the light should be limited to less than two bars to avoid "graying out" the encoded data. Surface 11 reflects the incident light through a lens 21 and onto a detector 23. Detector 23 is preferably a solid-state detector such as an integrated silicon photodiode and signal conditioning circuit mounted on substrate 15 adjacent source 13. Detector 23 preferably has a sensitive area receptive to illumination greater than the area illuminated on surface 11, whereby all of the light reflected from surface 11 will be utilized in generating an electrical signal from detector 23. Electrical signals received from detector 23 are transmitted through pins 27 to signal processing apparatus (not shown) for decoding. Some typical decoding circuits may be found in an article entitled "Signal Processing for Optical Bar Code Scanning" published in the December 1976 issue of Byte Magazine at page 77..

In accordance with aspects of the invention, lenses 17 and 21 are fabricated as elements of a single supporting structure 25, which is preferably of plastic. Each lens is configured to focus light originating in the plane of the source and detector to point 19 on surface 11. In devices which have been constructed the distance between source 13 and lens 17 is 0.2", while the distance from lens 17 to point 19 is 0.2". Lenses 17 and 21 are canted with respect to each other at an angle indicated as "$\theta$" in FIG. 1, which is selected to insure that light eminating from source 13 and focused to point 19 will be reflected back through lens 21 to detector 23. In the device of the dimensions described above, $\theta = 8°$.

Figure 2:
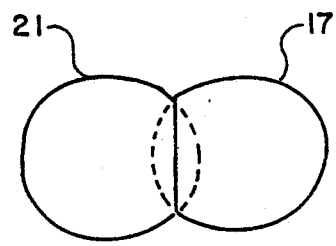
FIG. 2 shows a top view of a pair of siamesed hyperbolic lens used in the optical bar code reader.

The particular lens configuration for the source and focal plane positions indicated above can be generated according to formulae well known in the art. To correct for spherical aberration, lenses 17 and 21 are preferably of the hyberbolic type; i.e. the lens surfaces are portions of hyperbolic surfaces which are selected according to techniques known in the art to eliminate spherical aberration when the image to object ratio is 1:1. In order that lenses 17 and 21 may be of adequate size to insure good efficiency but yet be positioned with only a small angle between them, the lenses may be "siamesed"; that is, lenses 17 and 21 overlap as shown in FIG. 2 so that a portion of each lens surface (shown dotted) is omitted.

We claim:

1. An optical bar code reader for sensing a bar code on a surface, comprising:
   a housing;
   optical source means disposed in said housing for generating an optical beam;
   a first lens disposed in said housing to focus said optical beam onto a small area of said bar code;
   optical detecting means disposed in said housing for detecting a reflected optical beam incident thereon; and
   a second lens disposed in said housing to focus said optical beam reflected from said bar code onto said optical detecting means, said first and second lens each being an integral portion of a single molded support.

2. An optical bar code reader as in claim 1 wherein: said first and second lens are arranged in a partially overlapping configuration.

3. An optical bar code reader as in claim 1 wherein: said optical source means and said optical detecting means comprise a semiconductor element, mounted adjacent one another on a substrate in said housing.

* * * * *